United States Patent
Morgenstern et al.

(10) Patent No.: US 10,086,484 B2
(45) Date of Patent: Oct. 2, 2018

(54) MANUFACTURING OF COMPUTING DEVICES

(71) Applicant: Apple Inc., Cupertino, CA (US)

(72) Inventors: David J. Morgenstern, Palo Alto, CA (US); Laura M. DeForest, San Mateo, CA (US); Michelle R. Goldberg, Sunnyvale, CA (US); Nicholas Alan Rundle, San Jose, CA (US); Yuna Hu, Yuni (CN); Michael K. Morishita, Belmont, CA (US); Jacek M. Kolodziejski, San Jose, CA (US)

(73) Assignee: Apple Inc., Cupertino, CA (US)

( * ) Notice: Subject to any disclaimer, the term of this patent is extended or adjusted under 35 U.S.C. 154(b) by 593 days.

(21) Appl. No.: 13/651,000

(22) Filed: Oct. 12, 2012

(65) Prior Publication Data

US 2014/0102162 A1  Apr. 17, 2014

(51) Int. Cl.
*B23P 17/00* (2006.01)
*B21D 24/04* (2006.01)
(Continued)

(52) U.S. Cl.
CPC .............. *B23P 17/00* (2013.01); *B21D 19/08* (2013.01); *B21D 19/088* (2013.01); *B21D 22/20* (2013.01);
(Continued)

(58) Field of Classification Search
CPC ...... B21D 22/20; B21D 19/08; B21D 19/088; B21D 22/04; B21D 28/24; B21D 28/26;
(Continued)

(56) References Cited

U.S. PATENT DOCUMENTS 1,675,910 A  7/1928  Riker
1,782,373 A * 11/1930  Trageser .................. B23K 5/12
                                                    219/118
(Continued)

FOREIGN PATENT DOCUMENTS

CN  201248054  5/2009
CN  201940834  8/2011
(Continued)

OTHER PUBLICATIONS

Invitation to Pay Additional Fees, PCT Application No. PCT/US2013/064578, 6 pages, Jan. 9, 2014.
(Continued)

*Primary Examiner* — Shelley Self
*Assistant Examiner* — Mohammad Yusuf
(74) *Attorney, Agent, or Firm* — Dickinson Wright RLLP (57) ABSTRACT

Examples of tooling fixtures and methods for manufacturing computing devices are described. According to some examples, a computer component may be shaped using successive steps of forging after deep drawing. In some examples, certain components may be assembled to form sub-assemblies of computer components and the sub-assembly may then be machined to drive closer tolerances. According to other examples, a work holding tool is described which may include a first plurality of individually movable pins for supporting a first surface of a work piece, the tool also having a second plurality of individually movable pins for applying a restraining force over a second opposite surface of the work piece to retain the work piece in position while maintaining it in its natural state.

12 Claims, 8 Drawing Sheets

(51) Int. Cl.
   *B21D 22/20* (2006.01)
   *B21D 19/08* (2006.01)
   *B21D 22/26* (2006.01)
   *B23P 11/00* (2006.01)
   *B23C 3/00* (2006.01)
   *B21K 23/00* (2006.01)

(52) U.S. Cl.
   CPC ............ *B21D 22/26* (2013.01); *B21D 24/04* (2013.01); *B21K 23/00* (2013.01); *B23C 3/00* (2013.01); *B23P 11/00* (2013.01); *Y10T 29/49771* (2015.01); *Y10T 29/49998* (2015.01)

(58) Field of Classification Search
   CPC ...... B21D 5/002; B21D 11/02; B21D 11/085; B21D 11/22; B21D 28/32; B21D 31/02; B21D 43/003; B21D 51/52; B21J 5/08; B23P 17/00; B21K 23/00; B23Q 3/04; B23Q 3/062; B23Q 1/035; B25B 1/00; B25B 5/00
   USPC .................................... 72/413; 269/296, 266
   See application file for complete search history.

(56) References Cited

U.S. PATENT DOCUMENTS

| | | | |
|---|---|---|---|
| 2,859,510 A * | 11/1958 | Baxa ............................... | 72/325 |
| 2,909,281 A * | 10/1959 | Koskinen ........................ | 72/377 |
| 3,123,910 A | 3/1964 | Neilson | |
| 3,202,561 A | 8/1965 | Swanson et al. | |
| 4,038,783 A | 8/1977 | Rosenthal | |
| 4,088,312 A * | 5/1978 | Frosch ................... | B23Q 1/035 |
| | | | 269/21 |
| 4,111,029 A | 9/1978 | Dulaquais | |
| 4,164,704 A | 8/1979 | Kato et al. | |
| 4,232,928 A | 11/1980 | Wickersham | |
| 4,584,799 A | 4/1986 | Juvet | |
| 4,753,918 A | 6/1988 | Cyron | |
| 4,911,796 A | 3/1990 | Reed | |
| 5,028,075 A | 7/1991 | Donnelly | |
| 5,159,826 A * | 11/1992 | Miyazawa ............. | B21D 22/04 |
| | | | 72/335 |
| 5,163,793 A * | 11/1992 | Martinez .................. | B21J 15/10 |
| | | | 269/309 |
| 5,174,145 A * | 12/1992 | Tsuzuki ................. | B21D 51/40 |
| | | | 72/335 |
| 5,217,335 A | 6/1993 | Houchens, Jr. et al. | |
| 5,280,819 A | 1/1994 | Newkirk et al. | |
| 5,364,083 A * | 11/1994 | Ross ....................... | B23Q 1/035 |
| | | | 269/21 |
| 5,448,832 A * | 9/1995 | Kanemitsu ............. | B21D 22/04 |
| | | | 29/892.2 |
| 5,651,181 A * | 7/1997 | Shohara ................ | B21D 53/261 |
| | | | 29/892 |
| 5,722,646 A * | 3/1998 | Soderberg ............. | B25B 11/005 |
| | | | 269/20 |
| 5,779,218 A | 7/1998 | Kowanz | |
| 5,843,117 A | 12/1998 | Alt et al. | |
| 5,953,989 A | 9/1999 | Uchiyama et al. | |
| 6,149,506 A | 11/2000 | Duescher | |
| 6,183,347 B1 | 2/2001 | Shaw | |
| 6,406,769 B1 | 6/2002 | Delabre | |
| 6,453,783 B2 | 9/2002 | Yu et al. | |
| 6,464,080 B1 | 10/2002 | Morris et al. | |
| 6,517,995 B1 | 2/2003 | Jacobson et al. | |
| 6,811,136 B2 | 11/2004 | Eberhardt et al. | |
| 7,122,057 B2 | 10/2006 | Beam et al. | |
| 7,171,838 B2 | 2/2007 | Shiokawa | |
| 7,204,481 B2 * | 4/2007 | Sears ....................... | B23K 11/11 |
| | | | 269/266 |
| 7,540,697 B2 | 6/2009 | Wang et al. | |
| 7,582,175 B2 | 9/2009 | Trejo-Rincon | |
| 7,584,947 B2 * | 9/2009 | Freeland ................ | B23Q 1/035 |
| | | | 269/21 |
| 7,597,483 B2 | 10/2009 | Simmons et al. | |
| 7,685,676 B2 | 3/2010 | McClellan | |
| 7,774,918 B2 | 8/2010 | Ainsworth | |
| 8,015,852 B2 * | 9/2011 | Su ..................................... | 72/348 |
| 8,052,743 B2 | 11/2011 | Weber et al. | |
| 8,066,251 B2 | 11/2011 | Brown | |
| 8,252,379 B2 | 8/2012 | Nagashima | |
| 8,295,902 B2 | 10/2012 | Salahieh et al. | |
| 8,322,700 B2 * | 12/2012 | Saberton ................ | B23Q 1/035 |
| | | | 269/296 |
| 8,439,947 B2 | 5/2013 | Howard et al. | |
| 8,454,705 B2 | 6/2013 | Pressacco et al. | |
| 8,499,433 B2 * | 8/2013 | Matlack ................. | B23Q 3/062 |
| | | | 269/130 |
| 8,564,961 B2 | 10/2013 | Weber | |
| 8,568,551 B2 | 10/2013 | Brennan et al. | |
| 8,597,078 B2 | 12/2013 | Wilson et al. | |
| 8,601,849 B2 * | 12/2013 | Luo et al. ......................... | 72/340 |
| 8,994,608 B2 | 3/2015 | Russell-Clarke et al. | |
| 2005/0064345 A1 | 3/2005 | Oyake | |
| 2006/0008616 A1 | 1/2006 | Dean et al. | |
| 2006/0097127 A1 | 5/2006 | Firth | |
| 2007/0039691 A1 | 2/2007 | Mroz | |
| 2007/0234776 A1 * | 10/2007 | Shiga ................... | B21D 19/088 |
| | | | 72/325 |
| 2008/0206509 A1 | 8/2008 | Kent et al. | |
| 2008/0257006 A1 | 10/2008 | Durney et al. | |
| 2008/0312727 A1 | 12/2008 | Blank | |
| 2009/0014118 A1 | 1/2009 | Ratcliffe | |
| 2009/0043228 A1 | 2/2009 | Northrop et al. | |
| 2011/0041553 A1 | 2/2011 | Xiong et al. | |
| 2011/0156361 A1 | 6/2011 | Ghalambor et al. | |
| 2011/0267773 A1 | 11/2011 | MacFarlane | |
| 2013/0216740 A1 | 8/2013 | Russell-Clarke et al. | |
| 2013/0251934 A1 | 9/2013 | Caracciolo et al. | |
| 2013/0291367 A1 | 11/2013 | Russell-Clarke et al. | |
| 2014/0082926 A1 | 3/2014 | Tam et al. | |

FOREIGN PATENT DOCUMENTS

| | | |
|---|---|---|
| CN | 102316179 | 1/2012 |
| CN | 202872871 | 4/2013 |
| CN | 103873619 | 6/2014 |
| CN | 103951420 | 7/2014 |
| EP | 345022 A1 | 12/1989 |
| JP | 60244493 | 12/1985 |
| JP | 01156006 A | 6/1989 |
| JP | 200061745 | 2/2000 |
| KR | 1020080103031 | 11/2008 |
| WO | WO03/002289 | 1/2003 |
| WO | WO2012/007755 | 1/2012 |
| WO | WO2013/093822 | 6/2013 |

OTHER PUBLICATIONS

Author Unknown, "Laboratory Instruments," http://www.mocon.com, 2 pages, at least as early as Oct. 12, 2012.
Author Unknown, "Stewmac Inlay Tools and Materials," http://web.archirve.org/ . . . op/Inlay,_pearl/Tools_and_supplies_for:_Inlay,_pearl_cutting/Carbide_Downcut_Inlay_Router_Bits.html, 5 pages, at least as early as Dec. 4, 2013.
Taiwanese Patent Application No. 102136799—Office Action dated Sep. 13, 2016.
PCT Patent Application No. PCT/US2013/064578—International Preliminary Search Report and Written Opinion dated Jul. 8, 2014.
PCT Patent Application No. PCT/US2013/064578—Preliminary Written Opinion dated Nov. 11, 2014.
PCT Patent Application No. PCT/US2013/064578—International Preliminary Report on Patentability dated Feb. 5, 2015.

\* cited by examiner

MANUFACTURING OF COMPUTING DEVICES

TECHNICAL FIELD

The present disclosure relates generally to apparatuses and methods for manufacturing computing devices. Examples of methods and apparatus for achieving closer tolerances during the manufacture of computer components and assemblies are described.

BACKGROUND

Manufacturing processes include various processes in the broad categories of casting, molding, forming, machining, joining and rapid manufacturing. Casting and molding techniques generally relate to the initial shaping of a part from raw materials. Subsequently, the part may be used as is (e.g. as cast or molded) or it may be further processed by forming or machining components to their final shape and then assembling the components via any number of joining techniques.

In general, various forming techniques are known in the art. For example, in the context of metal working, a blank of raw material may be shaped using plastic deformation of the metal, for example by drawing, extrusion, and forging processes, to name a few. A blank of material may also be shaped to a desired shape using material removing processes (e.g. reducing operations). Reducing operations may include various cutting and machining operations. For example, in a typical machining operation, a cutting tool is used to remove an amount of material from the work piece to achieve a desired final shape of the part. Fixtures or work holding tools are devices used for providing a work piece in a desired location and/or orientation on the table of the mill (e.g. machine tool). Assembly technique can include various jointing operations, such as fastening, welding, bonding, curing and the like. Assembly operations may also require intricate and customized tools, including work holding tools, clamps, and other fixtures.

Generally, for any type of manufacturing process, tool design may be an important aspect of the manufacturing process, not only for ensuring the quality of the manufactured part but also with regards to increasing the manufacturing productivity (e.g. time/cost of production). Tools may be divided into several categories, including cutting tools, dies, and work holding tools, to name a few. A work holding tool is generally any fixture or jig which is used to restrain the raw material in all degrees of freedom during manufacture. As will be appreciated, improved methods and devices for restraining the work-piece may be needed in the art for achieving precise placement of the part relative to the cutting tools to achieve a desired quality of the final product. Furthermore, improved techniques for achieving desired tolerances and dimensions of features of computing device components may be needed in the art.

SUMMARY

Examples of work holding tools (e.g. tooling fixtures or jigs) are disclosed. According to one example, the work holding tool may include a base having a first plurality of movable support members, which may be configured to contact a first surface of a computer component, wherein the first surface of the component may be a curved surface, and wherein one or more of the first plurality of movable support members may be individually moveable relative to the base to follow a contour of the curved surface. The work holding tool may further include a lid having a second plurality of support members, which may be configured to apply a force against a second surface of the computer component to restrain the computer component from movement during the manufacturing operation. In some examples, the one or more moveable support members may be configured to contact the perimeter of the component, for example by being provided around the perimeter of the base. Fixed support members and locating features may also be provided, as will be further described.

According to some examples, the movable support members may be air activated. In other examples, they may be activated using any source of pneumatic or hydraulic pressure. The support members may be configured such that they apply minimal force to the first surface, which may be the cosmetic surface of the component in some examples. That is, in some examples, the movable support members may be configured to apply a force of up to 1 lb on the surface of the component. In this manner, damage to the cosmetic surface of the computer component may be avoided or minimized.

An example method for holding a work piece having a curved surface during a manufacturing operation may include placing the curved surface on a first plurality of movable support members, depressing one or more of the first plurality of movable support members by the weight of the work piece, immobilizing, after said depressing, the first plurality of movable support members, and restraining the work piece from movement using a second plurality of support members provided in contact with a second surface opposite the curved surface of the work piece.

In some examples, the method may further include extending the first plurality of movable support members from a retracted height to a deployed height using pneumatic or hydraulic pressure, for example. The method may also include locating the work piece relative to the first plurality of movable support members by using one or more locator features, which may be provided on the tooling fixture, and which may be configured to mate with corresponding features of the work piece. In some examples, one or more fixed support members may be provided, and the method may further include supporting at least a portion of the weight of the work piece using the one or more fixed support members.

The step of immobilizing of the first plurality of movable support members may include mechanically locking the first plurality of moveable support members in place after said moveable support members have been depressed to a new reference height by the weight of the work piece. According to some examples, the step of restraining the work piece may include applying a downward force with one or more of the second plurality of support members to press the work piece against the immobilized first plurality of movable support members. The method of holding a work piece may further includes the steps of machining a portion of the work piece, which in some examples may include adaptively machining a third surface of the work piece, wherein a forth surface is used as a reference or datum surface for purposes of the adaptive machining.

Examples of methods for shaping thin-walled components are described. In some examples, the method may include successive steps of forging after deep drawing. According to an example method, a computer component, for example a thin walled computer enclosure, is placed between two mating parts of a forming die. A drawing or punching press may then be used to apply a force on a surface of the enclosure along a first direction to form a feature, for example a hole including a flange. After deep drawing, a second force, for example a force generated by a hydraulic forging press, may be applied to the enclosure along a second direction, which may be generally opposite the direction of deep drawing. In this manner, the feature may be further shaped, for example causing edges (e.g. a radius at the hole perimeter) to become sharper and/or causing the wall thickness at a desired portion of the feature to increase.

According to one example, a method of shaping a hole of a component may include placing the component between a forming die and a blank holder, applying a first force to a first surface of the component along a first direction to cause a portion of the component to deform to a shape of the forming die, and applying a second force to a second surface of the component along a second direction opposite the first direction to cause the deformed portion of the component to compress. In some examples a pilot hole may be formed in the component prior to placing the component in the forming die, or the hole may be formed during application of the first force (e.g. drawing or punching force).

In some examples, forming the hole in the deformed portion may include removing material from the deformed portion (e.g. by cutting or trimming excess material), or it may include applying sufficient force with the drawing press to cause the press to punch through the deformed portion. Features, having various transverse cross-sections may be formed (e.g. circular, rectangular, or irregularly shaped holes or slots). In some examples, the surface through which a hole is being formed may be substantially flat, while in other examples, the surface may be curved. The hole or other feature may be formed substantially perpendicular to the surface or it may be formed at an angle. That is, in some examples, the first and/or second forces may be applied along a direction which is generally perpendicular to the central plane of the thin-walled component. In some examples, the drawing/punching force (e.g. the first force) may be applied at an angle, other than a 90 degree angle, relative to the central plane of the component.

Furthermore, a tolerance for an assembly, which is a closer tolerance than the combined tolerances of the constituent components, may be achieved according to the examples herein. An example method for achieving a closer tolerance for computer device assembly may include machining an intermediate assembly after one or more components have been assembled to form the intermediate assembly. According to some examples, a thin-walled computer enclosure may be formed and shaped into a desired configuration. Subsequently, certain components may be assembled, for example, weld boss features, which may be used for mounting various other computer components thereto. After having attached one or more of the weld bosses to the computer enclosure to form an intermediate assembly, the intermediate assembly may be machined to obtain a desired tolerance which may be higher than the combined tolerances of the constituent components.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

Figure 1:
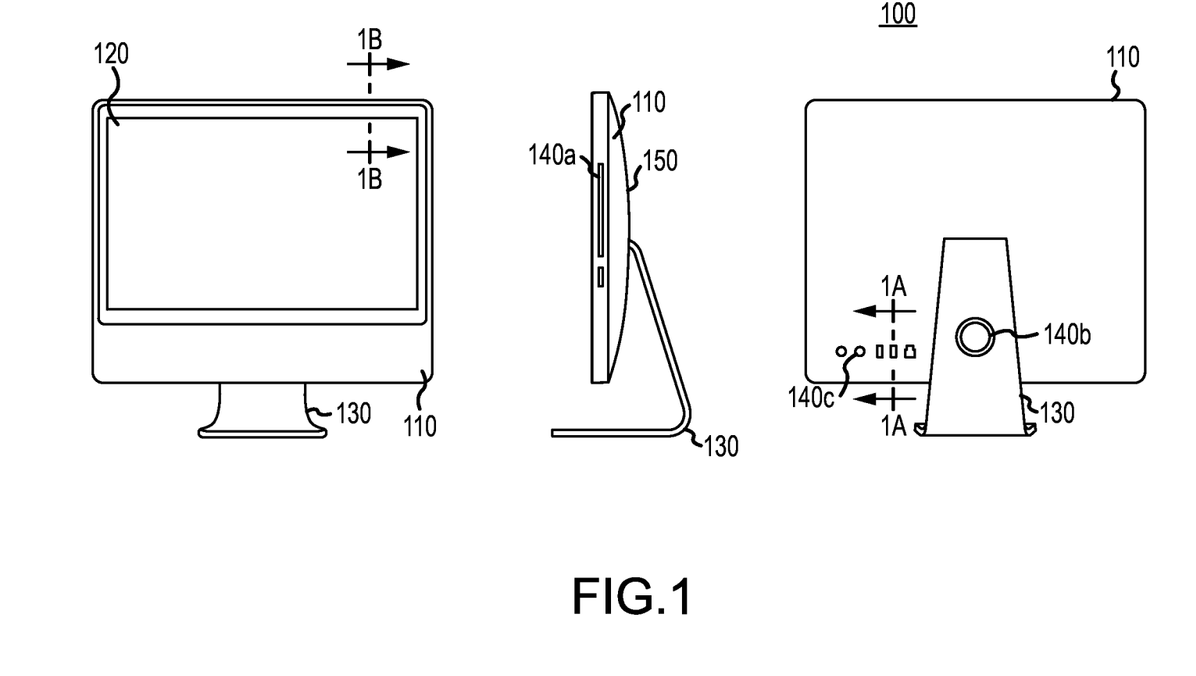
FIG. 1 is a schematic showing front, side, and back views of a computing device manufactured according to at least some of the examples described herein.

The present disclosure relates generally to manufacturing and assembly techniques and devices for facilitating improved manufacturing techniques of computing devices. FIG. 1 shows an example of a computing device which may be manufactured using one or more of the techniques described herein. It should be understood that the figures generally are meant to be representational, not necessarily exact. Accordingly, the shapes, sizes, tolerances and the like of some or all elements discussed herein may vary from what is explicitly shown in the figures. For example, certain elements may be thicker or thinner than illustrated, for example as a result of manufacturing operations. Likewise, edges of elements may be curved or smooth rather than sharp (and vice versa). Such variations are encompassed by the description herein.

FIG. 1 shows a front, side, and back view of a computing device 100 fabricated using, in part, the examples of manufacturing techniques described herein. The computing device 100 includes a display 120, an enclosure 110, a stand 130, and numerous internal computer components (not shown in FIG. 1). The internal computer components may be provided within the enclosure 110 and mounted to interior surfaces thereof. In addition, the display 120, which may be an integrated display module including a display device and a cover glass, may also be mounted to the enclosure 110. The enclosure 110 may have one or more holes or cutouts 140a-140c provided therethrough for accommodating various internal components and/or functionality. For example, one or more cutouts may be provided in the enclosure for ventilation purposes or for providing access to disc drives, or other internal components (see e.g., DVD slot 140a). In some examples, cutouts may be provided for allowing sound to be delivered to the ambiance from a microphone disposed within the enclosure. Other holes or cutouts 140b, 140c may be included to permit access to a power input port or for accessing the input/output ports of the various I/O interface devices.

The enclosure 110 may be a generally thin-walled component, which may be, in some examples, fabricated from sheet metal, such as aluminum sheet metal. The sheet metal may be cut to and formed into a desired shape, to which other components may subsequently be attached using various assembly techniques. In some examples, the enclosure 110 may instead be fabricated from a plate of a metallic raw material, which is machined to a desired shape and thickness. Any combinations of conventional forming and machining techniques may be used in addition to or in conjunction with the examples of the present disclosure without departing from the scope of the present disclosure. While specific examples directed to machining and assembling metallic parts are described, in other examples the enclosure 110 or other components of the computing device 100 may be made of plastic, composites, or combinations thereof.

In some examples, the enclosure 110 may have one or more curved surfaces 150, which may be aesthetically pleasing and may increase internal volume when compared to a flat surface joining the sidewalls at the same point. However, the complex curvature of surface 150 may create various challenges in terms of the manufacturing and assembly of the device 100, as will be further described. Furthermore, for functional or aesthetic reasons, the enclosure 110 may be manufactured as a unitary structure (e.g. a monolithic piece fabricated from a single blank of raw material). For example, the ability to form features, such as holes, may be made more difficult by the curvature of the enclosure 110. Also, creating sharp edges of flanged surfaces (e.g., the flanges surface 111 of FIG. 1A, or the flange 210 of FIG. 2B) may also be made more challenging when one or more of the surfaces of the component being formed is curved. The examples of the present disclosure may address many of these and other manufacturing challenges with respect to forming components for computing devices.

As described, the enclosure 110 may have one or more openings or holes formed through the thickness of the enclosure 110. For example, one or more I/O openings 140c may be provided on the curved back portion of the enclosure, or one or more openings 140a may be included on other sides of the enclosure. The openings may be formed using cutting techniques (e.g. machining/drilling), shaping/metal working techniques (e.g. drawing/punching), or combinations thereof, depending on the final shape and configuration desired. The one or more openings may have flanges, and other flanged surfaces may be formed along other portions of the enclosure 110. Examples of methods of forming a hole in a thin-walled computer component (e.g. a computer enclosure) and/or techniques for shaping a flange will now be described with reference to FIGS. 2-3.

Forming Techniques, Including Forging after Deep Drawing

Methods according to the present disclosure may be used to obtain features with wall thicknesses which may be greater than the thickness of the raw material and/or the thickness of the material during intermediate stages of production. Furthermore, flanges with sharp edges may be formed using the techniques described. Generally, if variable thickness is desired across a length or width of a part, additive techniques may be used to weld or fuse additional material to a portion of the part. Likewise, a blank having a thickness grater than or equal to the maximum desired thickness may be used and machined down to the profile desired. However, both of these techniques may be wasteful, time consuming, and therefore more be more costly to use. Accordingly, an improved method for achieving a particular wall thickness at a desired location on a part is described.

Figure 1A:
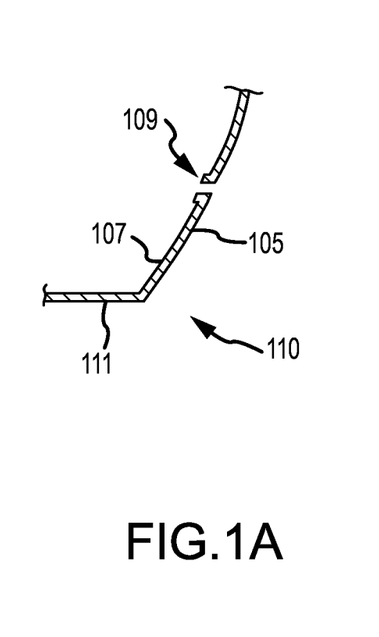
FIG. 1A is a partial cross-section taken along line 1A-1A in FIG. 1 showing a curved profile of the back cover of the computing device in FIG. 1
Figure 2A:
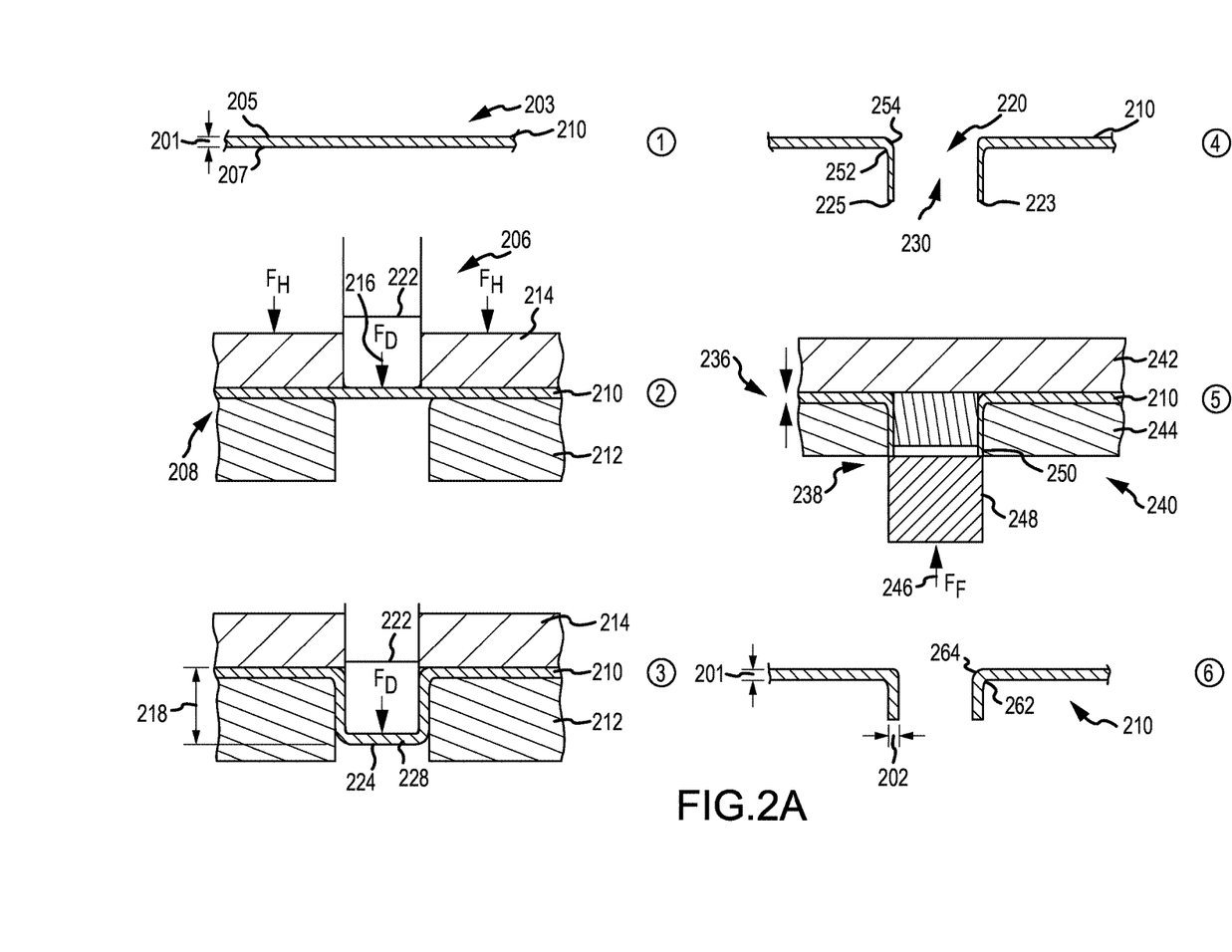
FIG. 2A is a schematic diagram of a manufacturing process according to an example of the present disclosure.

FIG. 2 shows an example method according to the present disclosure. The example methods may be used to shape virtually any computer component, and particularly thin-walled components, such as computer enclosures. As shown in FIG. 2, a deep drawing process, generally shown in stages 2-3, may be used to shape the example component 210 (e.g. computer enclosure, or others) and/or to form a feature 220 on or through a surface 205 of the component. Subsequently, a forging process, as shown in stage 5, may be used on the previously formed feature 220 to obtain a resulting thickness 202, which may be different than the thickness 201 of the component 210 and/or to obtain a sharp edge 273, for example along the perimeter of the feature 220. For simplicity and illustrative purposes, the component 210 in the example in FIG. 2 is a flat component (e.g., shows a flat portion of a computer component 210). However it will be understood that the component 210 may have virtually any contour as may be desired. For example, the component 210 may have one or more curved surfaces, for example as shown in FIG. 1A, or the component 210 may include one or more surfaces, which are angled relative to one another.

Figure 3A:
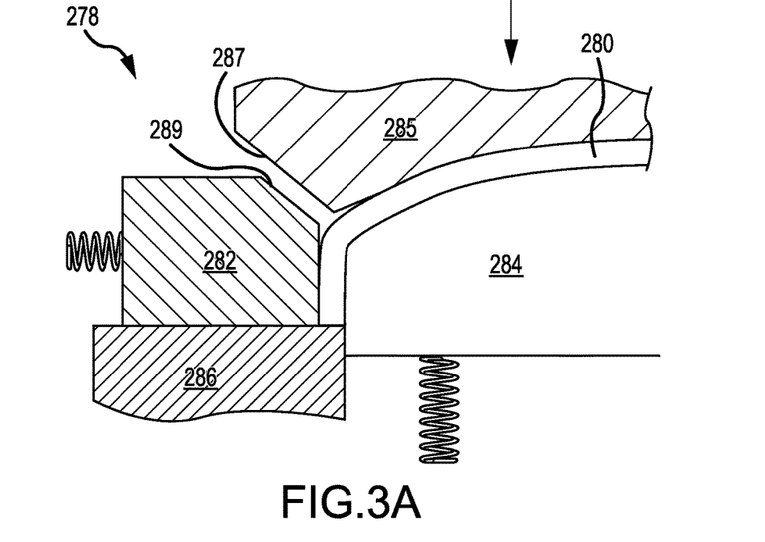
FIG. 3A is a schematic diagram of a first manufacturing process according to yet another example of the present disclosure.

Returning now to the example in FIG. 2, in stage 1 of the example method, the component 210, for example the computer enclosure 110 as described above with reference to FIG. 1, is shown prior to undergoing the forming processes described herein. Other thin-walled computer parts may be processed using the examples herein. For example, internal structures, such as clips, brackets, or the like, may be processed using the present examples so as to form certain features as may be desired. In other examples, the external housings of handheld or other portable computing devices (e.g., laptops, tablets, smart phones, or the like), or of peripheral devices such as external drives, displays, keyboards, mice, and others, may be processed using the techniques described. The component 210 may have a thickness 201 which may be constant across a portion 203 of the component 210. In some examples, the initial thickness (e.g. the thickness of the raw material) may vary along the length and/or width of the component 210. In some examples, the component 210 may be fabricated using a non-ferrous sheet metal, for example aluminum, and may have a constant thickness throughout. In other examples, and as described above, the component may be cast or machined down to the desired thickness 201. In some examples, the component may be flat or it may have one or more curved surfaces, as will be further described with reference to FIG. 3.

As shown in stage 2, the component 210 may be placed in a deep drawing press 206. That is, the component 210 may be placed between the mating parts of a forming die

208. A first surface of the component may be placed in contact with the surface of the female part 212 of the forming die. A holding part 214 may be used to retain the component 210 in place and/or to prevent or minimize wrinkles which may be caused by circumferential compressive stresses experience by the component 210 during drawing. A downward holding force $F_H$ may be applied to the holding part 214 to retain the component 210 in place during the drawing process.

During the deep drawing process, as shown in stage 3, a drawing force $F_D$ is applied by a male part 222 of the press 206 along a first direction 216 to cause the material of component 210 to plastically deform into the shape of the die 208. In this manner a feature 220 may be formed through the surfaces of the component 210. The drawing process may continue until a desired depth 218 is achieved, or until the male part/press 222 punches through the component 210. A feature 220, which may be a hole 230 as shown in stage 4, may be formed in this manner. In other examples and as will be further described below with reference to FIG. 2B, the component 210 may be pre-punched in that a pilot hole may be formed prior to the drawing process in the component 210, which pilot hole may direct the formation of the hole 230.

In some examples, deep drawing to the desired depth 218 may be achieved incrementally so as to avoid undesirable deformation and/or shearing of the component 210. In certain instances and/or depending on the malleability of the material, it may be desirable to draw the component 210 from its initial state shown in stages 1 and 2 to one or more intermediate states of deformation less than the desired final deformed state shown in stages 3 and 4. For example, the male part/press 222 may be extended downward to a first intermediate position to cause a first intermediate deformation. The drawing process may be paused for a period of time, and the press 222 may subsequently be extended downward to another position which may be a second intermediate position or the final position achieving the desired length of 218 of the deep draw. The part 210 may be annealed during this process (e.g. between intermediate steps or by performing the deep drawing at an elevated temperature) to prevent and/or mitigate any hardening of the material, which may occur during the deep drawing process. In some examples, the drawing press 222 may be extended downwards until the bottom portion 224 of the component 210 shears off to form the hole or opening 230. Alternatively, a trimming process may be used to remove a portion of the material and form the opening 230. In some examples, excess material 228 (e.g. at the bottom portion 224) may be removed using any of a variety of conventional cutting operations. The edges 223, 225 of the feature 220 may be further processed (e.g. filed or flattened), if desired, prior to the forging operation. The component 210 is shown with flattened edges 225, 223 in step 4, for example.

Next, in stage 5, the component 210 with the newly formed features 220 may be placed on a forging press 240. The blank may be secured between a pair of holding plates 242, 244 of a holding tool 236, with the feature 220 protruding through an opening 238 in the holding tool 236. A forging press 248 may be used to apply a second force $F_F$ in a direction 246 opposite the drawing direction 216, so as to cause compression of the material of the component 210. During this stage, the feature 220 may be deformed so as to compress the protruding portion of the feature 210, decreasing the height of the feature 210. In some instances the thickness 202 of the flange of hole 230 may be substantially the same as the thickness 201 of the raw material, or it may be greater. Generally, the thickness of the raw material (e.g. part 210) may decrease during intermediate stages of the forming process, for example during the deep drawing stages. In this regard, the backward forging stage may facilitate returning the wall thickness of the flange to the initial thickness of the raw material.

In some examples, the holding part 242 may be further configured to control the deformation of the walls of feature 220 during forging, for example to prevent out-of-plane deformation or buckling. In one example, an insert 234 may be provided through the hole 230, which has an outer diameter or outer profile which is slightly less than the diameter of the hole 230. The insert 234 may serve as a mold line to which the walls 250 of the feature 220 may deform during the forging process. As shown in Step 6, the resulting component 210 may have a feature (e.g. hole 230) which has a wall thickness 202 which may be substantially the same or greater than the wall thickness 201 of the rest of the component 210, for example depending on the magnitude and/or duration of the compressive force $F_F$ and/or the shape of the insert 234.

In other examples, the portion 203 of the component may have a first wall thickness 201, and the newly formed feature 220 may have a wall thickness which is substantially the same as the first wall thickness. By forging subsequent to the drawing step, an increased wall thickness may be achieved. That is, in some examples, following the forging step, the feature 220 may have a second thickness 202, which is greater than the first thickness. In some examples, the first thickness (e.g. starting wall thickness) may be about 2.0 mm. When accounting for manufacturing tolerances, the first thickness may range from about 1.5 mm to about 2.5 mm. In some examples, the thickness may be increased by about 30 to 40% using the methods described herein. That is, in some examples, the second thickness of the feature may range from about 2.1 mm to about 3.3 mm. In some examples, the second thickness may be about 2.6 mm to 2.8 mm. However, as described above, both the initial and final thicknesses (e.g. 201 and 202 respectively) may be substantially the same after the completion of the process, and they may range from about 1.5 mm to about 2.8 mm.

Moreover, the geometry of the feature 210 may be modified using forging following a deep drawing process. In some examples, a first inner radius 252 and a first outer radius 254 of the feature 220 may be defined during the deep drawing process. The first inner radius 252 may be the radius formed at the compression side of the deforming portion, while the first outer radius 254 may be the radius formed at the opposite (e.g. tension side). Following the forging process, a second inner radius 262 and a second outer radius 264 may be defined, wherein the second inner radius 262 may be smaller than the first inner radius 252 and a second outer radius 264 may be smaller than the first inner radius 252. In some examples, the second outer radius 264 may approach zero thereby defining a sharp edge at the perimeter of hole 230.

Figure 2B:
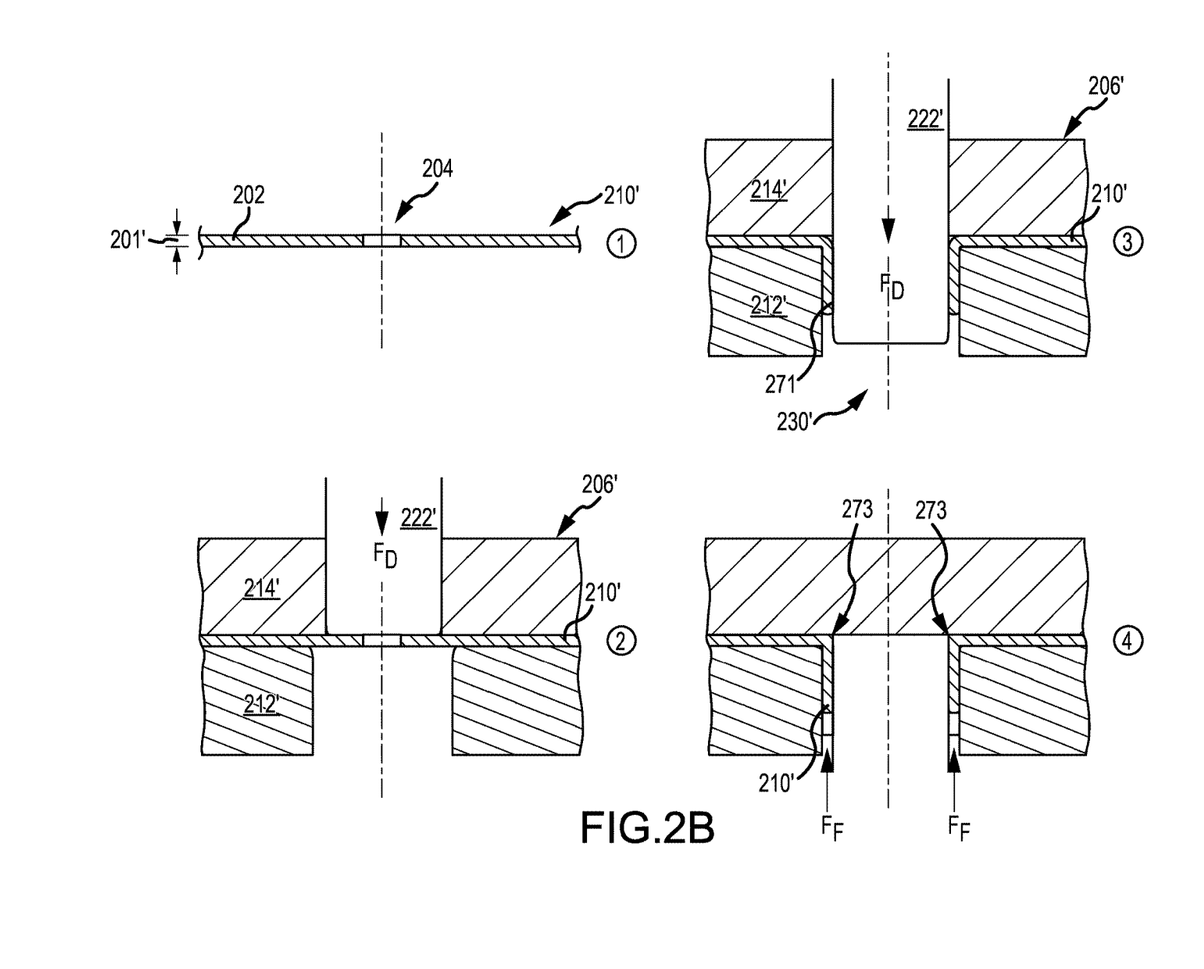
FIG. 2B is a schematic diagram of a manufacturing process according to another example of the present disclosure.

FIG. 2B depicts another embodiment of a method for forming features according to the present disclosure. A deep drawing process, as shown in steps (ii)-(iii), may be followed by a forging process, as shown in step (iv), to achieve certain features of the component 210', which may be an enclosure or other structural member of a computer, for example the computer 100. Similar to the method described above with reference to FIG. 2A, a blank of material 202, which may be curved or flat as depicted in step (i), may be placed in a forging tool 206'. In this example, a pre-punched blank of material 202 (with pre-formed hole 204) may be used. The pre-punched blank 202 may be positioned in the forming tool with the press or punch 222' disposed coaxially with respect to the hole 204, as shown in step (ii). The pre-punched blank 202 may be drawn or flanged as shown in step (iii). As a result of the drawing or flanging step, the thickness of the flange 271 may be thinner than the thickness 201' of the blank of material 202 at step (iii) of the process. During a subsequent step, the component 210' is forged as shown in step (iv), which allows a sharp edge 273 to be formed at the perimeter of the hole 230'. The thickness of the flange 271 after the forging step (e.g. step iv) may be about the same as the thickness 201' of the blank of material 202 or it may be different. Irrespective of the final thickness of the flange 271, a crisp edge 273 may be achieved using this technique of deep drawing followed by forging, wherein the forging may be done in a direction generally opposite to the direction of drawing.

While specific examples have been described with reference to forming a feature on flat surface, the present methods are not limited in this way and can be applied to a curved surface without departing from the scope of this disclosure. In some examples, the component 210 may be substantially flat. In other examples, the component which may be the back cover 110 of the device 100, may have one or more curved surface 105, 107, as shown in FIG. 1A. That is, in some examples, the first 105 and second 107 surfaces of a curved component 110 may be provided between a die and a holding part of a deep drawing tool, the die and holding part being shaped so as to complement the surfaces 105 and 107. Furthermore, a deep drawing process may be performed by applying a force normal to the surface 105, or in some examples, the force may be applied at an angle. By drawing/stamping at an angle to the surfaces, 105, 107, a features 109 which is parallel to the edge 111 of the enclosure may be obtained.

Furthermore, features having virtually any cross sectional profile (e.g. perimeter shape) may be formed as described. For example, the feature 109 may be an I/O port have a circular shape (see 104c) for accommodating a circular the I/O interface therethrough. In other examples, the feature 104 may be a rectangular I/O hole or other opening in the enclosure 110 for accommodating other devices or functionality, as may be desired.

Figure 3B:
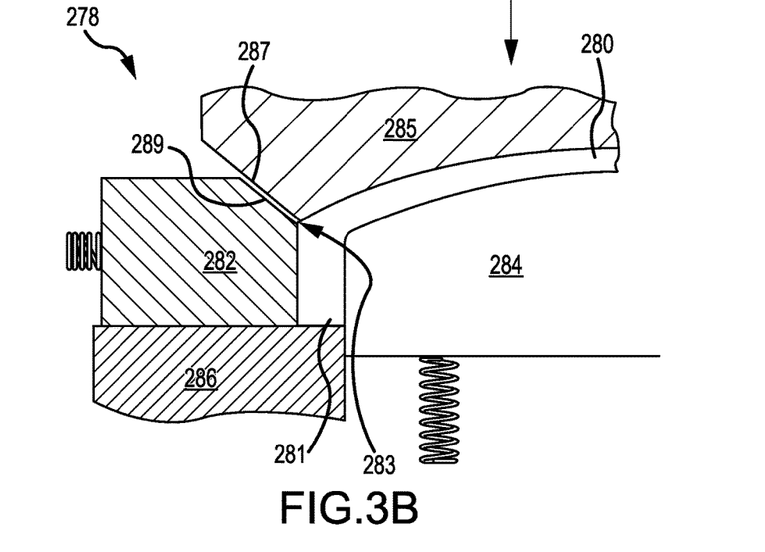
FIG. 3B is a schematic diagram of a second manufacturing process, following that of FIG. 3A, according to yet another example of the present disclosure.

FIGS. 3A and 3B show an example of another embodiment of forming techniques according to the present disclosure. In FIG. 3A, a blank sheet of material 280 may be formed to a desired shape for example by bending one or more surfaces and/or introducing other features as may be desired. In this example, a perimeter of the material 280 is being formed into a flange 281 and a crisp edge 283 is defined using the process depicted and described herein. The material 280, which may be a thin sheet of metal, such as aluminum, may be placed between holding portions 282, 284, 286 of a tool 278. Some or all of the holding portions may be stationary; however in some examples, some of the holding portions may be spring loaded so that the may deflect slightly yet fully support the material 280 during the forming process. A portion 285 of the tool may be configured to apply a downward force as shown by the arrow. As depicted in FIG. 3B, the pressing tool (e.g. portion 285) deforms the top portion of the material 280 to form the crisp edge 283 as the edge 287 of the portion 285 and the edge 289 of the holding portion 282 come together. This operation may also thicken the flange 281, as shown in FIG. 3B. Other edges and/or features of computer components may be formed using the techniques described and the specific examples are provided for illustration only.

As will be appreciated, deep drawing or stamping a curved surface may be more challenging and more specialized tooling (e.g. forming and holding dies) may be required. In addition to the challenges presented during drawing operations, curved surfaces impose similar challenges during many other manufacturing processes. For example, in order to machine a component which has one or more curved faces, a specialized work holding tools or fixtures may be needed. Examples of methods and apparatus for work holding of curved components will now be described with reference to FIGS. 4 and 5, which may address some of the problems in the art.

Apparatus and Method of Work Holding

As previously described, work holding tools (e.g. fixtures or jigs) are structures typically used in manufacturing to control or restrict the movement of a component or material while it is being worked on. Work holding tools may be fairly simple or they may be complex. Work holding tools may use one or more clamps for holding the work piece rigidly in place and may also include locating features for positioning and aligning the work piece relative to the cutting tools. Planar surfaces may generally be easier to fixture to the typically planar surface of the table of the mill. In the case of more complex geometries (e.g. components with predominantly curved surfaces), customized fixtures may be required. However, even a custom fixture may provide a less than optimal solution. A custom fixture, which may for example be a negative mold of the part to be machined, would be manufactured to specified tolerances, just like any other part. Thus, some variance between the nominal or design dimensions and the actual or as-built dimensions may be present. Furthermore, and analogously to the fixture itself, variances may inevitably exists between the individual copies of the part to be machined within the custom fixture. These variance may result from manufacturing tolerances and work quality, as will be further described below. As such, one or more of the individual parts may unavoidably be deformed into position when fixtured using even a custom tool. Such deformation not only imposes stresses on the part, which may be undesirable, but may also result in departure from the specified tolerances.

Figure 4:
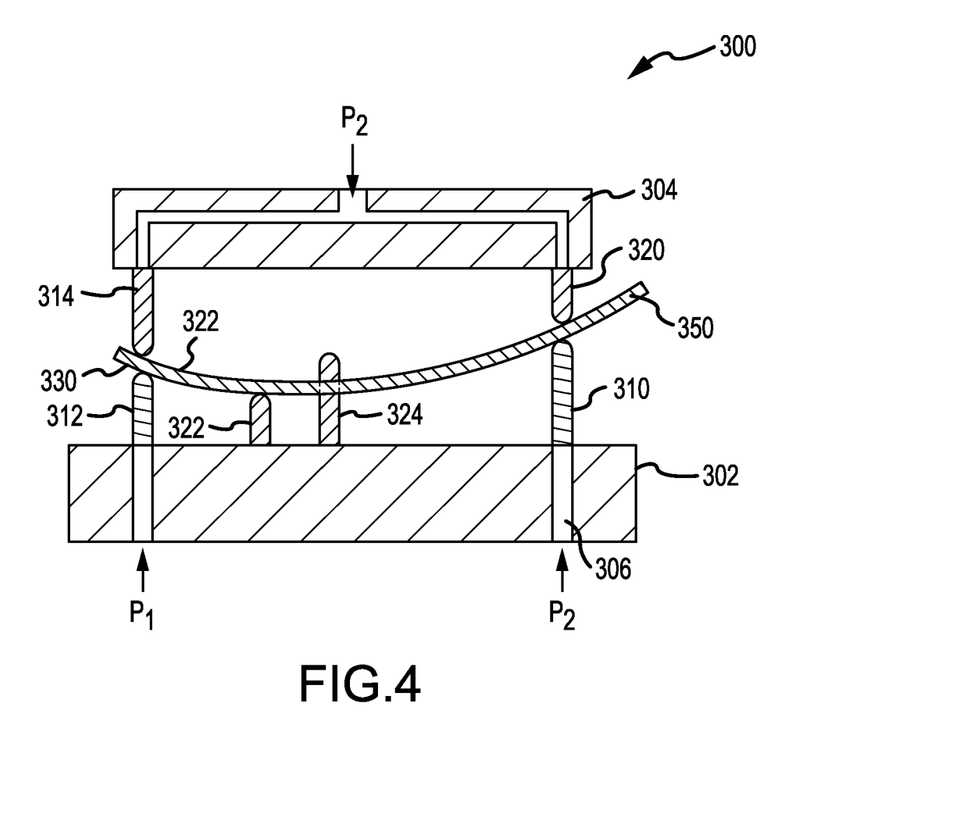
FIG. 4 is an illustration of an adjustable work holding tool according to the present disclosure.

Accordingly, an example apparatus for holding a work piece (e.g. work holding tool) in its natural state during manufacturing is described herein. FIG. 4 shows a simplified schematic illustration of such a work holding tool according to the present disclosure. As will be appreciated, the work holding tool 300 may function similar to a three-dimensional (3D) mechanical mold, the inner mold line of which can be varied from one machining operation to the next with little to no expense or time lost in between machining operations. As such the work holding tool 300 may not only speed up production cycles but may also allow for a higher quality product to be produced because the work piece (e.g. computer component 350) may not be inadvertently deformed during machining.

The work holding tool 300 may include a base 302 which may have a first plurality of individually movable support members (e.g. bottom pins) 310. The first plurality of individually movable support members 310 may be configured to contact a first surface 330 of the component 350. The work holding tool may also include a lid 304 with a second plurality of individually movable support members (e.g. top pins) 320. The second plurality of individually movable support members 320 may be configured to contact a second surface 332 of the component 350. The pins 320 may be configured to apply a force against the second surface 332 to restrain the component 350 from movement during manufacturing. That is, the base 302 and lid 304 may work in conjunction to restrain the work piece (e.g. component 350) sandwiched therebetween along all three axes.

As will be appreciated and further described the first 310 and second 320 pluralities of movable pins may accommodate virtually any complex geometry therebetween. Furthermore, because pairs opposing pins (e.g. pin 312 and 314), in the present example, act along the same axis to apply a restraining force, the component 350 sandwiched between the respective pins 310, 320 is not being deformed from its natural (e.g. relaxed) state. In some examples, the top pins 320 and bottom pins 310 may not align and may instead be configured to act along different axes, parallel but offset from one another. In the latter configuration, minimal or no deformation may be caused to the component 350 as sufficient number of pins may be used to distribute the loading about the surfaces 330, 332 of the component 350. In the example in FIG. 4, only a few pins are shown for clarity and illustration, however, in some examples, substantially any number of support members may be used of the base and/or lid.

One or more of the individually movable pins (e.g. 312, 314) may be configured such that their height is variable and is individually and independently adjustable to a desired height. The pins 310, when at rest, may be provided in a lower or collapsed position, in which the pins may be fully collapsed within the base 302. That is the pins 310 and 320 may have a first height which may be a nominal minimum height. The pins may be activated using pressure, for example air or other types of pneumatic pressure. In some examples hydraulic pressure may be used. One or more pressure sources $P_1$-$P_3$ may be provided in fluid communication with each of the plurality of pins 310, 320. In some examples, a first pressure source $P_1$ may feed all of the pins 310 of the base, and a second pressure source $P_2$ may feed the pins 320 of the lid. In some examples, two or more pressure sources (e.g. $P_1$ and $P_3$ as shown in FIG. 4) may be provided for one or both sides (e.g. base and/or lid) of the work holding tool 300, such that individual ones or sets of pins are independently supplied with pressure and thereby independently controlled. This may allow for only certain ones of the pins 310, 320 to be activated and used for a particular machining operation.

Upon activation (e.g. when pressure is provided through a fluid channel 306), the pins may be forced upwards to a second height, which is the height of their extended or deployed position. The second height may be the maximum height that the pins can be extend to, which may be determined by hard stops. Once the pins are activated, the work holding tool may be ready to receive the part, as will be further described below. The work holding tool 300 may include one or more fixed pins 322 which may be configured to support at least a portion of the weight of the component 350, as will be further described. The work holding tool 300 may also include one or more locating features 324, which may be used to locate and align the part relative to the tool. In some examples, one or more of the locating features 324 may be a locating pin which is configured to be inserted through a corresponding hole in the component 350. In some examples, the locating features 324 may be any other features configured to register with a corresponding features of the component 350.

Figure 5:
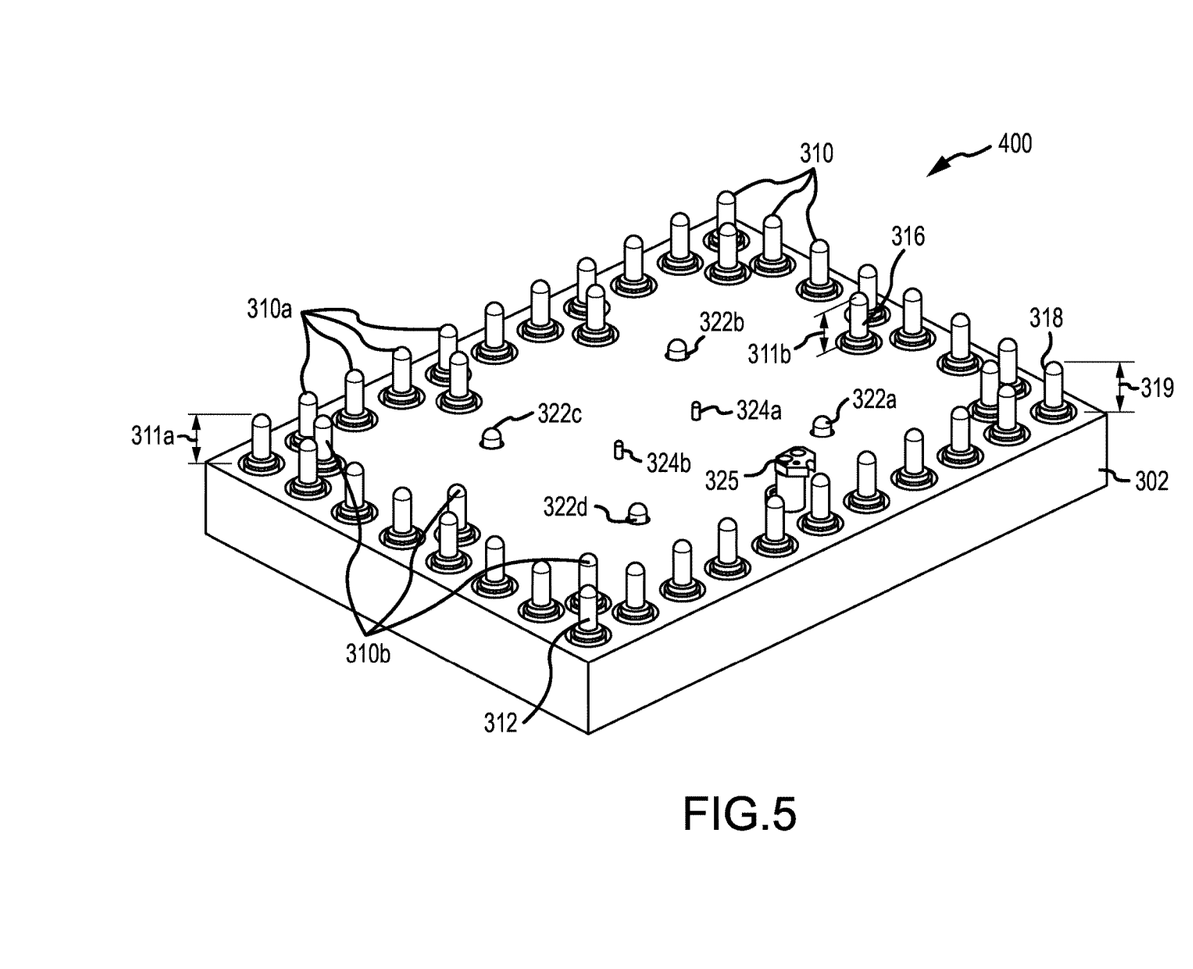
FIG. 5 is an isometric view of a base of a work holding tool according to one example of the present disclosure.

FIG. 5 shows an example of a bottom half 400 of a work holding tool 300. As previously described, the work holding tool 300 may include a base 302, with a plurality of movable pins 310. In some examples, the pins 310 may be provided about the perimeter of the base 302 and may be configured to contact a perimeter of the computer component 350 (not shown in FIG. 5). As described, the pins may be activated by pressure, such as air pressure, to be deployed to their extended position. Multiple groupings of pins 310a, 310b may be provided. In some examples, the pins of the first grouping 310a may be separately controlled than the pins of the second grouping 310b. In some examples, the pins of the first grouping 310a may be configured to deploy to a maximum height 311a, which is different than the maximum height 311b of the pins of the second grouping 310b.

The base 302 of the work holding tool may also include one or more fixed pins 322. In some examples, four fixed pins 322a-322d may be provided, each of the four fixed pins positioned within each quadrant of the tool and configured to contact a point within the corresponding quadrants of the component 350. As will be understood, the fixed pins 322 may be rigidly mounted to the base 302 and may not be adjustable in height. The fixed pins 322 may accordingly support at least a portion of the weight of component 350, while the remaining pins (e.g. movable pins 310) assist in balancing the component 350 on the fixture. Furthermore, one or more locating features may be included. The locating features may be insertion pins 324a, 324b which may be provided through an opening in the component being machined. Other locating or support features may also be provided without departing from the scope of this disclosure. In one example, the base may include a chin support 325 which is configured to pass through an opening of the enclosure 110 e.g. back opening 140b) and support the chin of the enclosure. Other support or locating features may be included and customized for the specific part being used with the work holding tool 300.

An example method of holding a work piece (e.g. component 350) during manufacturing will now be described to facilitate further understanding of the work holding tool 300. The method may include placing the curved surface on the first plurality of movable support members, depressing one or more of the first plurality of movable support members by the weight of the work piece, immobilizing, after said depressing, the first plurality of movable support members, and restraining the work piece from movement using a second plurality of support members provided in contact with a second surface opposite the curved surface of the work piece.

Once activated, the tool 300 may be ready to receive the work piece (e.g. component 350). The component 350 may be placed on the pins 310 and one or more of the pins may be depressed by the weight of the part. In this manner, one or more of the pins 312, 316 may deflect downwards individually to mold around the unique curvature of the surface 330 of the component 350. Once the part is positioned in the desired orientation and location, one or more of the plurality of pins 312, 316 may be locked into place such that further displacement of the pins is prevented. In some examples, the pins may be locked using a mechanical locking mechanism 318. The mechanical locking mechanism may be implemented using conventional techniques to rigidly lock the pin at the new reference height 319 of the pin. The new reference height 319 may be a third height which may be different from the first (e.g. minimum) or second (e.g. maximum) respective height of each pin. Some of the pins may not deflect when the part is placed on the base, and in some examples, certain pins may be disabled/deactivated and not used for particular operations.

After the pins are locked into place, the top portion (e.g. lid 304 as shown schematically in FIG. 4) may be provided in contact with the surface 332. Prior to placing the lid 304, one or more of the pins 320 of the lid may be activated in a similar manner as the pins of the base, and after positioning the lid into place, the top pins 320 may also be locked into their new reference position. In some examples, the top pins 320 may be fixed pins and the lid may be configured to be placed in contact with the surface 332 and clamped into position. The lid 304 may be shaped to provide sufficient clearances for the cutting tool to access any of the surfaces to be machined. In some examples, the lid 304 may be smaller than the base 302, and in some examples, the lid 304 may include fewer pins than the base 302. Numerous variations of the apparatus and methods described are possible without departure from the scope of the present disclosure. Some or all of the steps may be performed out of sequence and additional optional steps may be added without departing from the present scope.

As will be appreciated, once restrained within the work holding tool 300, the component 350 may be further processed. In some examples, the work holding tool 300 and component 350 contained therein may be provided on a table of a machine tool for machining at least portions of the component 350. The component 350 may be a single part (e.g. enclosure 110) or it may be a sub-assembly of parts. In some examples, the component 350 may be adaptively machined. As will be understood, adaptive machining may be performed by using a feature or a surface of the work piece as a datum or reference while machining another surface within the prescribed tolerance from the reference surface. In the present example, and as will be further described below, tight tolerances may need to be maintained for certain features or clearances. Using adaptive machining in conjunction with the work holding tool configured for maintaining the work piece in its natural state, more precise tolerances may be achieved than otherwise possible using conventional techniques and fixtures.

Machining Post Assembly

A manufacturing tolerance may be defined as the permissible limit or limits of variation in physical dimensions of a manufactured part. Dimensions or surface characteristics of a part may vary within certain practical limits without significantly affecting functioning of equipment or a process. Tolerances are specified to allow reasonable leeway for imperfections and inherent variability without compromising performance and/or aesthetics. A variation beyond the tolerance is said to be non-compliant or exceeding the tolerance regardless of if this breach was of the lower or the upper bound.

Close or tight tolerances are more difficult, and therefore more costly, to achieve. For a toleranced dimension or feature there may be up to hundreds or more toleranced dimensions imposed on the manufacturing equipment being used (e.g. fixtures, transporters, dies, clamps, and other machine tool elements). In addition, significantly more time may be required in set-up and execution of the particular manufacturing operation. Conversely, larger or looser tolerances may significantly affect the operation of the device or the aesthetics of the finished product. Accordingly, to optimize production times and costs, it is often desirable to specify the largest possible tolerance while maintaining proper functionality. That is, precision is typically only introduced selectively due to the increased manufacturing costs associated with tighter tolerances.

Tighter tolerances may be important particularly when parts are designed to mate together in an assembly, particularly in the case of moving components. Closer geometric tolerances, while less frequently, may also be desirable from an aesthetic standpoint. For example, from an aesthetic standpoint, looser tolerances may result in visible misalignment of parts, which in some cases may be visible and displeasing to the end consumer.

Generally, tighter tolerances in an assembly are driven through requiring tighter tolerances of one or more of the constituent components of the assembly. Individual tolerances may be specified for each component of the assembly, with the total tolerance for the assembly being defined by the sum of the tolerances of the parts. Furthermore, certain processes may be able to achieve better tolerances than others, and accordingly process selection may be an important component of achieving the desired final tolerance of the assembly. However, and as previously discussed, the closer the tolerance required of the individual components, or the selection of more precise techniques and tooling, the greater the total cost of the product.

Figure 6:
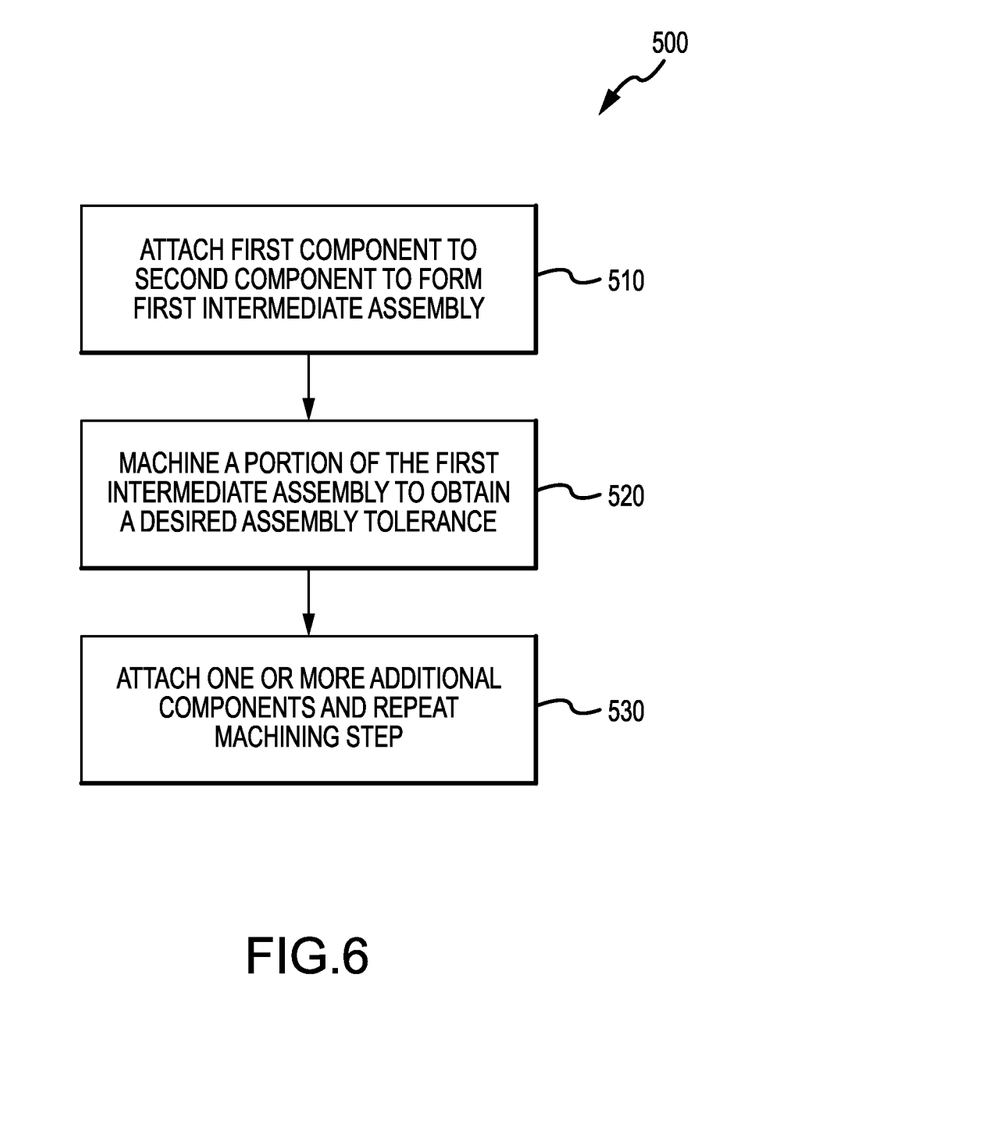
FIG. 6 is a flow diagram of a method for obtaining a desired tolerance of an assembly according to an example of the present disclosure.

FIG. 6 shows a flow diagram of a example method for achieving a desired tolerance of an assembly. In some examples, the method 500 may include forming a first assembly as shown in box 510 and machining a portion of the first assembly, as shown in box 520, to drive a tolerance which is closer than the sum total of the tolerances of the constituent components of the first assembly. In this manner any undesirable variance in the assembly tolerance can be absorbed using a machining operation post assembly. The first assembly may be formed by attaching a first component to a second component. In some examples, the first component may be a plurality of components. In some examples, additional components may be attached after the first machining operation forming a second intermediate assembly, and the second intermediate assembly may again be machined to tighten up the tolerances of the second intermediate assembly.

Figure 1B:
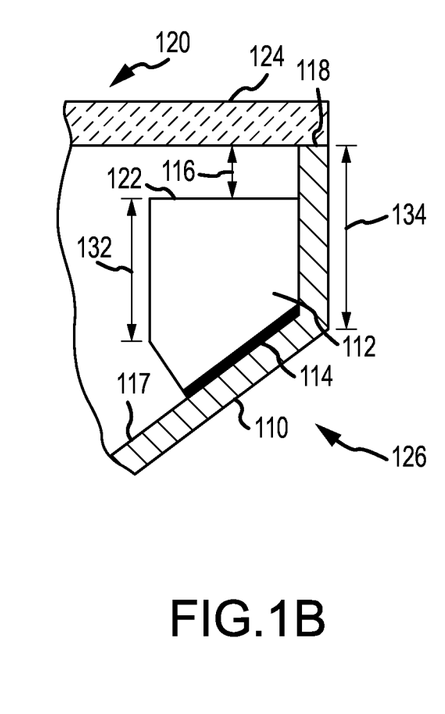
FIG. 1B is a partial cross-section taken along the line 1B-1B in FIG. 1.

According to one example, a first component, such as a computer enclosure 110 (see FIG. 1B) may be assembled with a second component or a plurality of components, which may include one or more bosses (e.g. feature 112 in FIG. 1B). One or more of the bosses 112 may be attached to the interior surface 117 of the computer enclosure 110, for example by welding (e.g. conventional or laser welding). A weld joint may be formed at 114. Bosses may be attached using any other conventional technique other than welding, and in the case of weld bosses, the weld joint may be located elsewhere than depicted in the figure. Per the design drawings, each of the bosses 112 may have been manufactured to a first set of tolerances, and the enclosure 110 may have been manufactures to a second set of tolerances. As will be understood, for any dimension which may need to be controlled, a tolerance from a reference line/surface (e.g. datum) may be specified. For example, the height 115 of the boss 112 may need to be controlled in the present example, so as to provide the required relative distance (e.g. clearance 116) between the edge 118 of the enclosure and the top edge 122 of the boss. In some examples, a precise clearance 116 may be required to allow for the mounting of other components, for example the display 120 and glass cover 124. In the present example, a boss 112 may have a first controlled dimension 132 with tolerance of +/−0.2 mm, and the enclosure may have a second controlled dimension 134 with tolerance of +/−0.2 mm. However, the distance 116 of the assembly 126 may have a tolerance 136 which is tighter than the tolerances obtainable based on the controlled dimensions (e.g. 132, 134) of the constituent components. In some examples, the tolerance of the clearance 116 may be +/−0.15 mm. Accordingly, even if the constituent components 112 and 110 are manufactured within their specified tolerances, it is possible that the assembly may be non-compliant. The methods according to the present disclosure may advantageously be used to absorb the excess variance in the dimensions and achieve the desired and/or specified assembly tolerance. According to the present examples, any variance in the tolerances may be removed by machining post assembly of the components (e.g. 110 and 112), and a closer tolerance may be obtained without driving up the cost for producing the constituent components individually to higher tolerances. Other components than the specific example described may be assembled to form intermediate assemblies which may be machined post assembly to tighten up the tolerances according to the present disclosure.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A machining method for shaping an enclosure for a consumer electronic device that is formed of plastically deformable metal, the method comprising:
    providing a retaining force by a fixturing device that supports a curved region of the enclosure in a non-deformable manner, the fixturing device having adjustable support members that are supported by upper and lower portions, wherein the adjustable support members independently move relative to each other and to both the upper and lower portions such that a first set of the adjustable support members conform to a first curved surface of the curved region, and a second set of the adjustable support members conform to a second curved surface of the curved region that is opposite to the first curved surface;
    applying a tensile force, by a deep drawing press having a contact area, to a first portion of the first curved surface corresponding to the contact area, wherein the tensile force causes the first portion to stretch to form a protruding feature having walls having a first thickness and that extend away from the second curved surface; and
    applying a compressive force in a direction opposite of the tensile force, by a forging press, to the second curved surface, thereby causing the walls to compress such that the walls have a second thickness that is greater than the first thickness.

2. The machining method of claim 1, wherein, subsequent to applying the tensile force, the walls of the protruding feature have an exposed curved edge.

3. The machining method of claim 2, wherein applying the compressive force causes the plastically deformable metal to compress in such a way that the exposed curved edge sharpens to form an exposed angular edge.

4. The machining method of claim 3, wherein the exposed angular edge has a greater thickness than the exposed curved edge.

5. The machining method of claim 1, wherein the retaining force applied by the adjustable support members to the first and second curved surfaces is less than one pound of force.

6. A method of shaping an enclosure for a consumer electronic device having a curved region, the method comprising:
    providing a retaining force by a holding tool that supports the curved region of the enclosure in a non-deformable manner, the holding tool having adjustable support members that are supported by upper and lower portions, wherein the adjustable support members independently move relative to each other and to both the upper and lower portions such that a first set of the adjustable support members support a first curved surface of the curved region, and a second set of the adjustable support members support a second curved surface of the curved region that is opposite to the first curved surface;
    applying a first force to a first portion of the first curved surface in a first direction that is generally perpendicular to a central plane of the enclosure to form a protruding feature in the first portion, wherein the protruding feature includes walls having a curved flanged surface that is defined by a major dimension and a minor dimension; and
    applying a second force to the walls in a second direction generally opposite the first direction to decrease the major and minor dimensions so that the curved flanged surface approaches a sharp flanged surface.

7. The method of claim 6, wherein prior to applying the first force, the method further comprises:
    forming a hole within the first portion of the first curved surface.

8. The method of claim 7, wherein a first press is aligned with the hole prior to applying the first force.

9. The method of claim 8, wherein the protruding feature has a substantially rectangular perimeter subsequent to applying the first force.

10. The method of claim 6, wherein the second force is applied to an exposed surface of the walls.

11. The machining method of claim 1, wherein the compressive force is applied to an exposed surface of the walls.

12. The method of claim 6, wherein the adjustable support members are locked at heights that conform to the first and second curved surfaces prior to applying the first and second forces.

* * * * *